United States Patent
Koudal et al.

(10) Patent No.: US 7,886,614 B2
(45) Date of Patent: Feb. 15, 2011

(54) MEASURING DEVICE AND METHOD FOR MONITORING A MEASURING DEIVCE

(75) Inventors: Ole Koudal, Baden (CH); Christian Matt, Aesch (CH); Gernot Engstler, Riehen (CH); Hans Pohl, Müllheim (DE)

(73) Assignee: Endress + Hauser Flowtec AG, Reinach (CH)

( * ) Notice: Subject to any disclaimer, the term of this patent is extended or adjusted under 35 U.S.C. 154(b) by 91 days.

(21) Appl. No.: 12/453,166

(22) Filed: Apr. 30, 2009

(65) Prior Publication Data

US 2009/0277278 A1 Nov. 12, 2009

(30) Foreign Application Priority Data

May 6, 2008 (DE) ...................... 10 2008 022 373

(51) Int. Cl.
*G01F 1/56* (2006.01)
(52) U.S. Cl. .................................... 73/861.08
(58) Field of Classification Search .............. 73/861.73, 73/861.15, 861.08
See application file for complete search history.

(56) References Cited

U.S. PATENT DOCUMENTS 4,930,356 A * 6/1990 Porges ...................... 73/861.08
5,351,558 A * 10/1994 Horn et al. ............... 73/861.08
5,560,246 A * 10/1996 Bottinger et al. ......... 73/861.15

FOREIGN PATENT DOCUMENTS

EP 1 464 923 A1 10/2004
GB 2 081 452 A 2/1982

* cited by examiner

*Primary Examiner*—Jewel Thompson
(74) *Attorney, Agent, or Firm*—Bacon & Thomas, PLLC

(57) ABSTRACT

A measuring device includes: a measuring transducer accommodated, at least partially, in a housing, for registering at least one, measured variable; and a measuring device electronics electrically connected, at least at times, with the measuring transducer. The measuring device electronics includes at least one measurement channel for registering and further processing at least one primary signal generated by means of the measuring transducer, and an electrical current measuring circuit for registering measuring-device-internally flowing, electrical currents. Furthermore, it is provided, that the electrical current measuring circuit registers, during operation, at least at times, especially recurringly, an electrical leakage current, which flows as a result of a potential difference existing, at least at times, between housing and measuring device electronics and as a result of an electrically conductive connection likewise existing between housing and measuring device electronics, especially an undesired, electrically conductive connection and/or an electrically conductive connection formed by a deposit affecting the housing. Taking into consideration the registered leakage current, the measuring device electronics generates, additionally, at least one state value, especially a digital state value, instantaneously representing an operating state, especially a defective operating state, of the measuring device.

35 Claims, 3 Drawing Sheets

MEASURING DEVICE AND METHOD FOR MONITORING A MEASURING DEIVCE

TECHNICAL FIELD

The invention relates to a measuring device, especially a measuring device embodied as a measuring, and/or switch, device of industrial measuring, and automation, technology and/or an electronic measuring device, for measuring and/or monitoring at least one measured variable of a medium conveyed or held in a pipeline and/or container. Moreover, the invention relates to a method for monitoring such a measuring device having a measuring transducer accommodated at least partially in a housing, especially a grounded housing, as well as a measuring device electronics connected, at least at times, with the measuring transducer.

BACKGROUND DISCUSSION

In industrial, process-measurements technology, especially, also, in connection with the automation of chemical or manufacturing processes and/or the automated control of industrial plants, electrical measuring- and/or switch-devices installed near to a process, so called field devices, such as e.g. Coriolis mass-flow measuring devices, density measuring devices, magneto-inductive flow measuring devices, vortex, flow measuring devices, ultrasonic flow measuring devices, thermal, mass-flow measuring devices, pressure measuring devices, fill-level measuring devices, temperature measuring devices, pH-value measuring devices, etc., are applied, which serve for producing measured values representing process variables in analog or digital form, as well as for producing measured-value signals lastly carrying these. The process variables to be registered can include, depending on application, for example, a mass flow, a density, a viscosity, a fill- or limit-level, a pressure or a temperature or the like, of a liquid, powdered, vaporous or gaseous medium and conveyed, or held, in a corresponding container, such as e.g. a pipeline or tank.

For registering the respective process variables, field devices of the aforementioned type include, in each case, a corresponding physical-to-electrical or chemical-to-electrical, measuring transducer. This is most often set into a wall of the container holding the medium or into the course of a line, for example, a pipeline, conveying the medium, and serves for producing at least one electrical measurement signal corresponding to the process variable to be registered. For processing the measurement signal, the measuring transducer is connected, further, with a measuring-device-internal, operating, and evaluating, circuit provided in a field-device electronics of the field device and serving for further processing or evaluation of the at least one measurement signal, as well as also for generating corresponding measured-value signals. Further examples for such measuring devices known, per se, to those the skilled in the art, especially, also, details concerning the construction, application and/or operation of such measuring devices, are described sufficiently at length and in detail in, among others, WO-A 07/130,024, WO-A 03/048874, WO-A 02/45045, WO-A 02/103327, WO-A 02/086426, WO-A 01/02816, WO-A 00/48157, WO-A 00/36 379, WO-A 00/14 485, WO-A 95/16 897, WO-A 88/02 853, WO-A 88/02 476, U.S. Pat. No. 7,134,348, U.S. Pat. No. 7,133,727, U.S. Pat. No. 7,075,313, U.S. Pat. No. 7,073,396, U.S. Pat. No. 7,032, 045, U.S. Pat. No. 6,854,055, U.S. Pat. No. 6,799,476, U.S. Pat. No. 6,776,053, U.S. Pat. No. 6,769,301, U.S. Pat. No. 6,711,958, U.S. Pat. No. 6,666,098, U.S. Pat. No. 6,662,120, U.S. Pat. No. 6,640,308, U.S. Pat. No. 6,577,989, U.S. Pat. No. 6,574,515, U.S. Pat. No. 6,556,447, U.S. Pat. No. 6,539, 819, U.S. Pat. No. 6,535,161, U.S. Pat. No. 6,512,358, U.S. Pat. No. 6,487,507, U.S. Pat. No. 6,484,591, U.S. Pat. No. 6,480,131, U.S. Pat. No. 6,476,522, U.S. Pat. No. 6,397,683, U.S. Pat. No. 6,366,436, U.S. Pat. No. 6,352,000, U.S. Pat. No. 6,311,136, U.S. Pat. No. 6,285,094, U.S. Pat. No. 6,269, 701, U.S. Pat. No. 6,236,322, U.S. Pat. No. 6,140,940, U.S. Pat. No. 6,051,783, U.S. Pat. No. 6,014,100, U.S. Pat. No. 6,006,609, U.S. Pat. No. 5,959,372, U.S. Pat. No. 5,796,011, U.S. Pat. No. 5,742,225, U.S. Pat. No. 5,742,225, U.S. Pat. No. 5,706,007, U.S. Pat. No. 5,687,100, U.S. Pat. No. 5,672, 975, U.S. Pat. No. 5,604,685, U.S. Pat. No. 5,535,243, U.S. Pat. No. 5,469,748, U.S. Pat. No. 5,416,723, U.S. Pat. No. 5,363,341, U.S. Pat. No. 5,359,881, U.S. Pat. No. 5,349,872, U.S. Pat. No. 5,231,884, U.S. Pat. No. 5,207,101, U.S. Pat. No. 5,131,279, U.S. Pat. No. 5,068,592, U.S. Pat. No. 5,065, 152, U.S. Pat. No. 5,052,230, U.S. Pat. No. 4,926,340, U.S. Pat. No. 4,850,213, U.S. Pat. No. 4,768,384, U.S. Pat. No. 4,716,770, U.S. Pat. No. 4,656,353, U.S. Pat. No. 4,617,607, U.S. Pat. No. 4,594,584, U.S. Pat. No. 4,574,328, U.S. Pat. No. 4,524,610, U.S. Pat. No. 4,468,971, U.S. Pat. No. 4,317, 116, U.S. Pat. No. 4,308,754, U.S. Pat. No. 3,878,725, US-A 2007/0217091, US-A 2006/0179956, US-A 2006/0161359, US-A 2006/0120054, US-A 2006/0112774, US-A 2006/ 0096390, US-A 2005/0139015, US-A 2004/0117675, EP-A 1 669 726, EP-A 1 158 289, EP-A 1 147 463, EP-A 1 058 093, EP-A 984 248, EP-A 591 926, EP-A 525 920, DE-A 102005 032 808, DE 100 41 166, DE-A 44 12 388, DE-A 39 34 007 or DE-A 37 11 754.

In the case of a large number of field devices of the type being discussed, the measuring transducer is, moreover, so driven during operation, at least at times, by a driver signal generated by the operating, and evaluating, circuit for producing the measurement signal, that it acts on the medium, in a manner suited for the measuring, at least mediately or, however, also practically directly, via a probe directly contacting the medium, in order to bring about, in the medium, reactions appropriately corresponding with the measured variable to be registered. The driver signal can, in such case, be controlled correspondingly, for example, as regards an electrical current level, a voltage level and/or a frequency. As examples for such active measuring transducers, thus measuring transducers correspondingly converting an electrical driver signal in the medium, can be named, especially, flow-measuring transducers serving for the measurement of media flowing, at least at times, e.g. flow-measuring transducers having at least one magnetic-field-producing coil driven by the driver signal, or at least one ultrasonic transmitter driven by the driver signal, or, however, also fill level- and/or limit level-transducers serving for measuring and/or monitoring fill levels in a container, such as e.g. those with a freely radiating, microwave antenna, Goubau-line or vibrating, immersion element.

Devices of the type being discussed have, additionally, at least one housing having at least one, usually pressure-tightly and/or explosion-resistantly closed, chamber accommodating electrical, electronic and/or electro-mechanical components and/or assemblies of the device, for example, components of the mentioned operating, and evaluating, circuit. Thus, field devices of the described type include, for accommodating the field-device electronics, most often a comparatively robust, especially impact-, pressure-, and/or weather-resistant, electronics-housing. This can, such as proposed e.g. in U.S. Pat. No. 6,397,683 or WO-A 00/36379, be arranged remotely from the field device and be connected with this only via a flexible line; it can, however, also, such as shown e.g. in EP-A 903 651 or EP-A 1 008 836, be arranged directly on the measuring transducer or on a measuring-transducer housing separately housing the measuring transducer. On occasion, then, the electronics-housing can, such as, for example, shown in EP-A 984 248, U.S. Pat. No. 4,594,584, U.S. Pat. No. 4,716,770 or U.S. Pat. No. 6,352,000, also serve for accommodating some mechanical components of the measuring transducer, such as e.g. membrane, rod, sleeve or tubular, deformation- or vibrating-elements operationally deforming under mechanical action; compare, in this connection, also the above mentioned U.S. Pat. No. 6,352,000 or U.S. Pat. No. 6,051,783.

In the case of field devices, the particular field-device electronics is usually electrically connected, most often arranged spatially removed, and most often also spatially distributed, from the field device, via corresponding electrical lines, to a superordinated electronic data processing system, to which the measured values produced by the respective field device are forwarded, near in time, by means of a measured value signal correspondingly carrying these values.

Electrical devices of the described type are additionally usually connected, by means of a data transmission network provided within the superordinated data processing system, with one another and/or with corresponding electronic process-controls, for example, programmable logic controllers installed on-site or with process-control computers installed in a remote, control room, where the measured values produced by means of the electronic device and digitized and correspondingly coded in suitable manner, are forwarded. By means of such process-control computers, the transmitted, measured values can be further processed and visualized as corresponding measurement results e.g. on monitors and/or transformed into control signals for other field devices embodied as actuating devices, such as e.g. magnetic valves, electric motors, etc. Since modern measuring arrangements can, most often, also be directly monitored from such control computers and, in given cases, can also be controlled and/or configured therefrom, operating data intended for the electronic device are equally sent in corresponding manner via aforementioned data transmission networks, which are, most often, hybrid as regards the transmission physics and/or transmission logic. Accordingly, the data processing system serves, in the case, in which the electronic device is embodied as a field device of the aforementioned type, especially, also, as a measuring device, usually also to condition the measured value signal delivered by the electronic device, corresponding to the requirements of downstream data transmission networks, for example, suitably to digitize it, and, in given cases, to convert it into a corresponding telegram, and/or to evaluate it on-site. Provided for such purpose in such data processing systems, electrically coupled with the pertinent connecting lines, are evaluating circuits, which pre- and/or further-process, as well as, in case required, suitably convert the measured values received from the respective measuring- and/or switch-device. Serving for data transmission in such industrial data processing systems are, at least sectionally, especially, serial fieldbusses, such as e.g. FOUNDATION FIELDBUS, RACKBUS-RS 485, PROFIBUS, etc., or, for example, also networks on the basis of the ETHERNET-standard, as well as the corresponding, most often comprehensively standardized, transmission-protocols. Besides the evaluating circuits required for the processing and converting of the measured values delivered by the connected field devices, such superordinated data processing systems have, most often, also electrical supply circuits serving for supplying the connected measuring- and/or switch-devices with electrical energy by providing a corresponding supply voltage, on occasion, directly fed by the connected fieldbus to the particular field-device electronics and to drive the electrical lines connected thereto as well as the electrical currents flowing through the field-device electronics. A supply circuit can in such case, be assigned, for example, in each case, to exactly one field device and can be accommodated, together with the evaluating circuit associated with the field device, for example, joined to a corresponding fieldbus adapter, in a shared electronics-housing, e.g. formed as a hatrail-module. It is, however, also quite usual, to accommodate supply circuits and evaluating circuits each in separate, on occasion, spatially remote from one another, electronics-housings and to wire them correspondingly with one another via external lines.

Industrial-strength, electrical, or also electronic, devices, especially field devices, of the named type, must, as is known, satisfy very high protection requirements, especially as regards the shielding of the therein placed, electrical components against outer, environmental influences, as regards protection against possible touching of voltage-carrying components and/or as regards suppression of electrical, ignition sparks in the case of malfunction. To this belongs, such as, for example, also explained in DE-A 100 41 166, especially, the requirement, that an electrical leakage current, which could flow, for example, in the case of body- or bypass-shunting as a result of damaged line insulation or as a result of conductive deposits, via housing to ground or earth, is not permitted to exceed a maximum allowable, highest value. In the case of connection of the electrical device to 250 V, this allowable highest value amounts, for example, to 10 mA. If these requirements are fulfilled, then the device meets, at least, the requirements of protection class 11, i.e. it is an electrical device with protective insulation. For implementing these requirements, it is accordingly required, that the housing of the electrical device be insulated sufficiently relative to all voltage-carrying parts of the device. Such insulation is especially then necessary, when the housing is made of electrically conductive material, for example, a metal. Typically, the insulation resistances between housing and measuring device electronics are, at least to begin with, essentially greater than 1 Mohm, about in the order of magnitude of 10 Mohm, or more, while such leakage-currents-enabling, electrically conducting connections between housing and measuring device electronics can have an electrical resistance around more than a decade smaller than the initially insulating resistance, especially smaller than 1 Mohm or even smaller than 500 kohm.

Electrical devices, which are designed to be operated also in explosion-endangered areas, must, moreover, also satisfy very high safety requirements as regards explosion protection. In such case, of concern, especially, is to prevent safely the forming of sparks or at least to assure, that a spark possibly occurring in the interior of a closed space has no effects on the environment, in order so, safely, to avoid the potentially possible triggering of an explosion. As, for example, also explained, in this connection, in the initially named EP-A 1 669 726, U.S. Pat. No. 6,366,436, U.S. Pat. No. 6,556,447 or US-A 2007/0217091, there are distinguished, for explosion protection, different ignition protection types, which are correspondingly set forth also in relevant standards and norms concerning electrical operating means for explosion-endangered areas, examples of such including e.g. US-American standard FM3600, the international standard IEC 60079-18 or the norms DIN FC 50014 ff. Thus e.g. according to the European standard FC 50 020:1994, explosion protection is present, when devices are embodied according to the therein defined ignition protection type, or also protection class, bearing the label "Intrinsic Safety" (Ex-i). In this protection class, the values for the electrical variables, electrical current, voltage and power in a device, have to lie, at all times, in each case, below a predetermined limit value. The three limit values are so selected, that, in the case of malfunction, e.g. through a short-circuit, the maximum occurring heat is not sufficient to produce an ignition spark. The electrical current is kept below the predetermined limit value e.g. by resistance, the voltage e.g. by Zener-diodes and the power by corresponding combination of electrical current- and voltage-limiting components. In the European standard FC 50 019:1994, another protection class is specified with the name "increased safety" (Ex-e). In the case of devices embodied according to this protection class, ignition, or explosion, protection is achieved, when the spatial distances between two different electrical potentials are so large, that a spark formation cannot, because of the distance, occur, even in the case of malfunction. This can, however, under circumstances, lead to the fact that circuit arrangements must have very large dimensions, in order to satisfy these requirements. Another protection, specified in the European standard FC 50 018:1994, is the ignition protection type "pressure-tight encapsulation" (Ex-d). Electrical devices embodied according to this protection class must have a pressure-resistant housing, via which it is assured, that an explosion occurring in the interior of the housing cannot be transmitted into the external space. Pressure-resistant housings are embodied with comparatively thick walls, in order that they have sufficient mechanical strength. In the USA, Canada, Japan and other countries, standards exist that are comparable with the aforementioned European norms.

Besides the aforementioned operational safety in the context of excluding endangering of persons and/or plants from causes emanating from the field-device, another requirement for such electronic devices formed as field devices is to assure, long-term, operational safety also in the context of reliability of the internally generated measurement signals, or the therefrom derived, measured values. Thus, for example, as a result of progressive deposit-formation and/or as a result of damaged insulation, undesirably formed, conductive connections within the measuring device electronics and, associated therewith, leakage currents flowing in the field device can lead to considerable corruption of measuring signals generated internally in the field device.

In order to be able to assure defect-free operation of such devices, as well as their operational safety over a very long period of time or to detect, as early as possible, possibly occurring, or impending, device defects, it is important to check recurringly especially also the integrity of the measuring device electronics. In the case of conventional field devices of the type being discussed, the integrity of the connected measuring device electronics is often checked by connecting a corresponding electronic measuring- and test-circuit, by means of which line- and insulation-resistances can be measured, externally via corresponding service-connections on the measuring device electronics and performing a corresponding impedance measurement on individual assemblies and/or lines of the measuring device electronics, in given cases accompanied by a temporary interruption of the actual measurement operation. However, the application of such separate, current measuring circuits, coupled with an on-site diagnosis performable only by service-personnel, means very high consumption of human resources, as well as associated logistical effort. Another special disadvantage of such separate measuring- and test-circuits is additionally the, most often required, temporary interruption of the actual measurement operation of the device, or an, in given cases, required separating of the measuring device electronics from a communication- and power supply-network possibly connected thereto.

SUMMARY OF THE INVENTION

An object of the invention is, therefore, to improve the reviewing of operating states and/or operational safety of electrical devices of the aforementioned type, especially, also, their associated electronics, toward the goal of enabling early detecting of impending defect states within the measuring device electronics, such as, for instance, body- and/or bypass-shunting brought about by conductive deposits and/or insulation defects, in given cases, also without mentionable limitation of the actual measurement operation and/or also in the course of a diagnosis performed on the measuring device recurringly and/or automatically.

For achieving the object, the invention resides in a measuring device for measuring and/or monitoring at least one measured variable of a medium conveyed or held in a pipeline and/or container, especially a measuring device embodied as a measuring, and/or switch, device of industrial measurements and automation technology and/or an electronic measuring device, which measuring device comprises:

for registering the at least one measured variable, a measuring transducer at least partially accommodated in a housing, especially a grounded and/or metal housing; and, electrically connected, at least at times, with the measuring transducer, a measuring device electronics, which includes at least one measurement channel for registering and further processing of at least one primary signal generated by means of the measuring transducer, and an electrical current measuring circuit for registering electrical currents flowing internally in the measuring device;

wherein the electrical current measuring circuit registers during operation, at least at times, especially recurringly, an electrical leakage current, which flows as a result of a potential difference existing, at least at times, between housing and measuring device electronics and as a result of an electrically conductive connection, especially an undesired electrically conductive connection and/or an electrically conductive connection formed by a deposit affecting the housing, likewise existing between housing and measuring device electronics.

Moreover, the invention resides in a method for monitoring a measuring device, especially a measuring device embodied as a measuring, and/or switch, device of industrial measurements and automation technology and/or an electronic measuring device, wherein the measuring device includes a measuring transducer at least partially accommodated in a housing, especially a grounded and/or metal housing, and a measuring device electronics electrically connected, at least at times, with the measuring transducer, which method comprises steps as follows:

producing a potential difference between housing and measuring device electronics for effecting a leakage current flowing both through the measuring device electronics as well also through an electrically conductive connection situated between housing and measuring device electronics and exposed to this potential difference, especially an undesired electrically conductive connection and/or an electrically conductive connection formed by a deposit affecting the housing and/or by condensed water;

registering the leakage current flowing as a result of the potential difference existing, at least instantaneously, between housing and measuring device electronics and as a result of the, at least instantaneously, existing, electrically conductive connection; and generating at least one state value, especially a digital state value, instantaneously representing an operating state, especially a defective operating state, of the measuring device, taking into consideration the registered leakage current.

In a first embodiment of the measuring device of the invention, it is provided, that the potential difference between housing and measuring device electronics is formed by placing the housing at a first electrical reference potential and at least one component of the measuring device electronics, especially the measurement channel, at least at times, at a second electrical reference potential different from the first electrical reference potential. Developing this embodiment of the invention further, it is additionally provided, that the housing is grounded for forming the first electrical reference potential, and/or that the measuring device electronics, at times, likewise lies at the first electrical reference potential.

In a second embodiment of the measuring device of the invention, it is provided, that such further includes at least one source circuit delivering, at an output, an, especially at least at times, essentially constant and/or clocked and/or pulse-shaped, output voltage. Developing this embodiment of the invention further, the output of the source circuit is, during operation, at least at times, especially durably, electrically connected with the housing for producing a potential difference between housing and measuring device electronics.

In a third embodiment of the measuring device of the invention, it is provided, that the source circuit is so embodied, that its output voltage is changeable, especially abruptly and/or stepwise.

In a fourth embodiment of the measuring device of the invention, it is provided, that the source circuit is so embodied, that its output voltage is an alternating voltage, especially an alternating voltage of changeable frequency.

In a fifth embodiment of the measuring device of the invention, it is provided, that the measuring device electronics additionally includes a filter circuit, especially a filter circuit formed by means of a resistor network serving as voltage divider and/or as current limiter and/or by means of a diode circuit serving as voltage rectifier and/or as voltage limiter and connected electrically, especially by means of switch, during operation, at least at times, especially durably, both to the output of the source circuit as well as also to the housing.

In a sixth embodiment of the measuring device of the invention, it is provided, that the measuring device electronics additionally includes a resistor network serving as voltage divider and/or as current limiter and connected electrically, especially by means of switch, during operation, at least at times, especially durably, both to the output of the source circuit as well as also to the housing.

In a seventh embodiment of the measuring device of the invention, it is provided, that the measuring device electronics additionally includes a diode circuit serving as voltage rectifier and/or as voltage limiter and connected electrically, especially by means of switch, during operation, at least at times, especially durably, both to the output of the source circuit as well as also to the housing.

In an eighth embodiment of the measuring device of the invention, it is provided, that wherein the at least one measurement channel is operated with a measuring-device-internal, useful voltage, and that the source circuit is so embodied, that its output voltage and/or the potential difference between housing and measuring device electronics is set, at least at times, to 50% of the internal, useful voltage. Developing this embodiment of the invention further, the useful voltage serves also for operating the source circuit.

In a ninth embodiment of the measuring device of the invention, it is provided, that the source circuit is so embodied, that its output voltage serving for forming the potential difference between housing and measuring device electronics amounts to maximum 40 volt, especially less than 32 volt, and/or that the potential difference between housing and measuring device electronics serving for driving the leakage current is always kept smaller than 40 volt, especially, at its highest, 32 volt.

In a tenth embodiment of the measuring device of the invention, the electrically conducting connection between housing and measuring device electronics enabling the leakage current has an electrical resistance, which is smaller, especially more than a decade smaller, than a beginning insulating resistance between housing and measuring device electronics and/or smaller than 1 Mohm, especially smaller than 500 kohm.

In an eleventh embodiment of the measuring device of the invention, it is provided, that a beginning insulating resistance between housing and measuring device electronics is greater than 1 Mohm, especially greater than 10 Mohm.

In a twelfth embodiment of the measuring device of the invention, it is provided, that the electrical current measuring circuit includes a sensing resistor, through which the leakage current flows and across which a voltage falls, which is essentially proportional to the leakage current.

In a thirteenth embodiment of the measuring device of the invention, it is provided, that the measuring device electronics includes at least one comparator for comparing the registered leakage current with at least one threshold value predetermined therefor, especially, also, a revisable, predetermined threshold value.

In a fourteenth embodiment of the measuring device of the invention, it is provided, that the measuring device electronics, based on the leakage current registered by the electrical current measuring circuit, generates an alarm, which signals occurrence of a defect in the measuring device, especially a defect caused by undesired forming of conductive deposits within the housing.

In a fifteenth embodiment of the measuring device of the invention, it is provided, that such further includes a display element for visualizing measuring-device-internally generated, defect reports, especially of an alarm based on the leakage current registered by the electrical current measuring circuit.

In a sixteenth embodiment of the measuring device of the invention, it is provided, that the measuring device electronics, based on the leakage current registered by the electrical current measuring circuit, generates at least one, especially digital, state value, which represents, instantaneously, an operating state of the measuring device, especially a defective operating state. Developing this embodiment of the invention further, it is additionally provided, that the measuring device electronics, based on the state value, generates an alarm, which signals the occurrence of a defect in the measuring device, especially a defect caused by undesired forming of conductive deposits within the housing. Alternatively thereto, or in supplementation thereof, it is further provided, that the electrical current measuring circuit includes at least one A/D-converter for digitizing the registered leakage current, and that the measuring device electronics further includes a microcomputer communicating, at least at times, with the electrical current measuring circuit via an A/D-converter, and the microcomputer, based on the leakage current registered and digitized by the electrical current measuring circuit, generates the at least one state value.

In a seventeenth embodiment of the measuring device of the invention, it is provided, that the measuring device electronics further includes a microcomputer, especially a microcomputer communicating, at least at times, with the electrical current measuring circuit and/or, at least at times, with the source circuit. Developing this embodiment of the invention further, it is additionally provided, that the electrical current measuring circuit includes at least one A/D-converter for digitizing the registered leakage current, which A/D-converter delivers at an output, at least at times, a digital signal digitally representing the registered leakage current.

In a first embodiment of the method of the invention, it is provided, that the potential difference between housing and measuring device electronics is formed by placing the housing at a first electrical reference potential and at least one component of the measuring device electronics, especially a measurement channel for registering at least one primary signal generated by means of the measuring transducer, at least at times, at a second electrical reference potential different from the first electrical reference.

In a second embodiment of the method of the invention, it is provided, that the housing is grounded for forming the first electrical reference potential and/or the measuring device electronics, at times, likewise lies at the first electrical reference potential.

In a third embodiment of the method of the invention, it is provided, that such further includes a step of changing, especially abruptly and/or stepwise and/or periodically changing, at least one reference potential of the measuring device electronics for producing the potential difference between housing and measuring device electronics.

In a fourth embodiment of the method of the invention, it is provided, that such further includes a step of galvanically connecting to the housing, especially with interposition of a current, and/or voltage, limiting, filter circuit, an output of a source circuit provided within the measuring device electronics and delivering an output voltage, especially an output voltage, which is, at least at times, essentially constant and/or clocked and/or pulse-shaped, for forming the potential difference between housing and measuring device electronics.

In a fifth embodiment of the method of the invention, it is provided, that such further includes a step of applying the at least one state value for generating an alarm signaling the occurrence of a defect in the measuring device, especially a defect caused by undesired forming of conductive deposits within the housing.

In a sixth embodiment of the method of the invention, it is provided, that such further includes a step of applying the at least one state value for activating a display element communicating, at least at times, especially instantaneously, with the measuring device electronics, especially, also, a display element visualizing defect reports generated by the measuring device.

In a seventh embodiment of the method of the invention, it is provided, that such further includes a step of comparing the at least one state value with at least one threshold value predetermined therefor, especially, also, a revisable, threshold value.

In an eighth embodiment of the method of the invention, it is provided, that the measuring device electronics includes at least one measurement channel operated with a measuring-device-internal, useful voltage for registering at least one primary signal generated by means of the measuring transducer, and wherein the potential difference between housing and measuring device electronics is set, at least at times, at 50% of the internal, useful voltage.

In a ninth embodiment of the method of the invention, it is provided, that the potential difference between housing and measuring device electronics is set at 40 volt or less, especially smaller than 32 volt, for driving the leakage current.

In a tenth embodiment of the method of the invention, it is provided, that such further includes a step of producing at least one primary signal by means of the measuring transducer, wherein the at least one primary signal corresponds to at least one measured variable of a medium conveyed or held in a pipeline and/or container, especially an electrically grounded pipeline and/or container.

A basic idea of the invention is to test operating states and/or operational safety of electrical devices of the aforementioned type, especially, also, their respective electronics, with "on-board" measuring means, such as, for instance, the aforementioned electrical current measuring circuit and/or the aforementioned source circuit, especially, also, automatically or semi automatically in dialog with the user, and, indeed, as much as possible without interruption, or at least without mentionable limitation, of the actual measurement operation.

In particular, there are, now, a number of options, in which to embody or develop the aforementioned measuring devices, or methods, in the context of the invention.

BRIEF DESCRIPTION OF THE DRAWINGS

A further understanding of the invention, as well as, also, advantageous embodiments of such on the basis of the examples of embodiments illustrated in the figures of the drawing; equal parts are provided in the figures, moreover, with equal reference characters. In case helpful for avoiding clutter, already used reference characters are omitted in subsequent figures. In particular, the figures of the drawing show as follows.

DETAILED DISCUSSION IN CONJUNCTION WITH THE DRAWINGS

Figure 1:
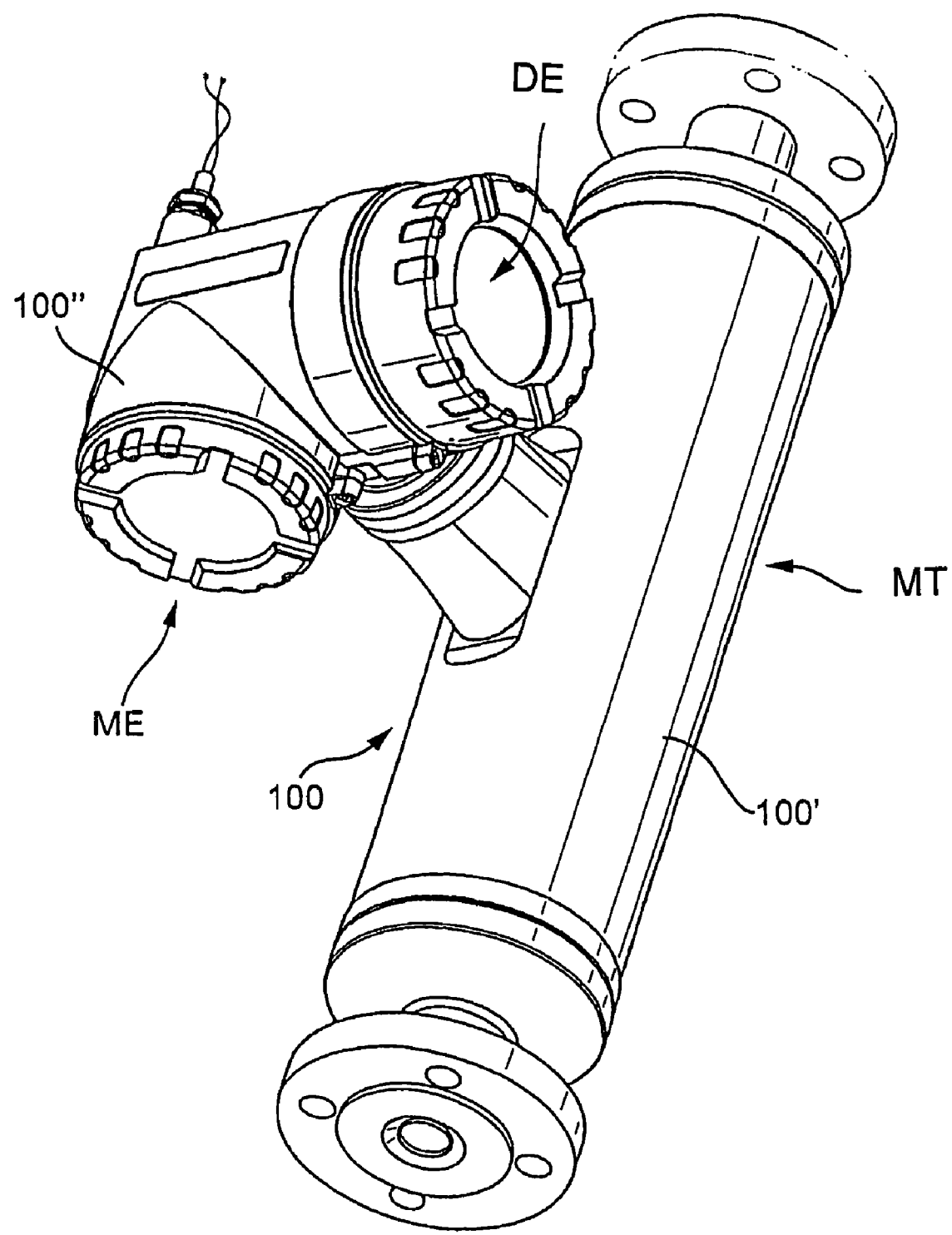
FIG. 1 schematically, in a perspective, side view, a measuring device for measuring and/or monitoring at least one measured variable of a medium conveyed or held in a pipeline and/or container.

FIG. 1 shows a measuring device, especially a measuring device embodied as a measuring, and/or switch, device of industrial measuring, and automation, technology. The measuring device has at least one housing 100, especially a metal and/or modular housing, in which electrical, electronic and/or electro-mechanical components and/or assemblies of the measuring device are accommodated. The measuring device is, especially, provided, for measuring a physical and/or chemical, measured variable of a medium conveyed or held in a pipeline and/or container, especially an electrically grounded pipeline and/or container. Accordingly, the measuring device can be, for example, a Coriolis, mass flow, measuring device, a density, measuring device, a magneto-inductive flow measuring device, a vortex, flow measuring device, an ultrasonic, flow measuring device, a thermal, mass flow, measuring device, a pressure, measuring device, a fill level, measuring device, a temperature, measuring device or the like.

Figure 2:
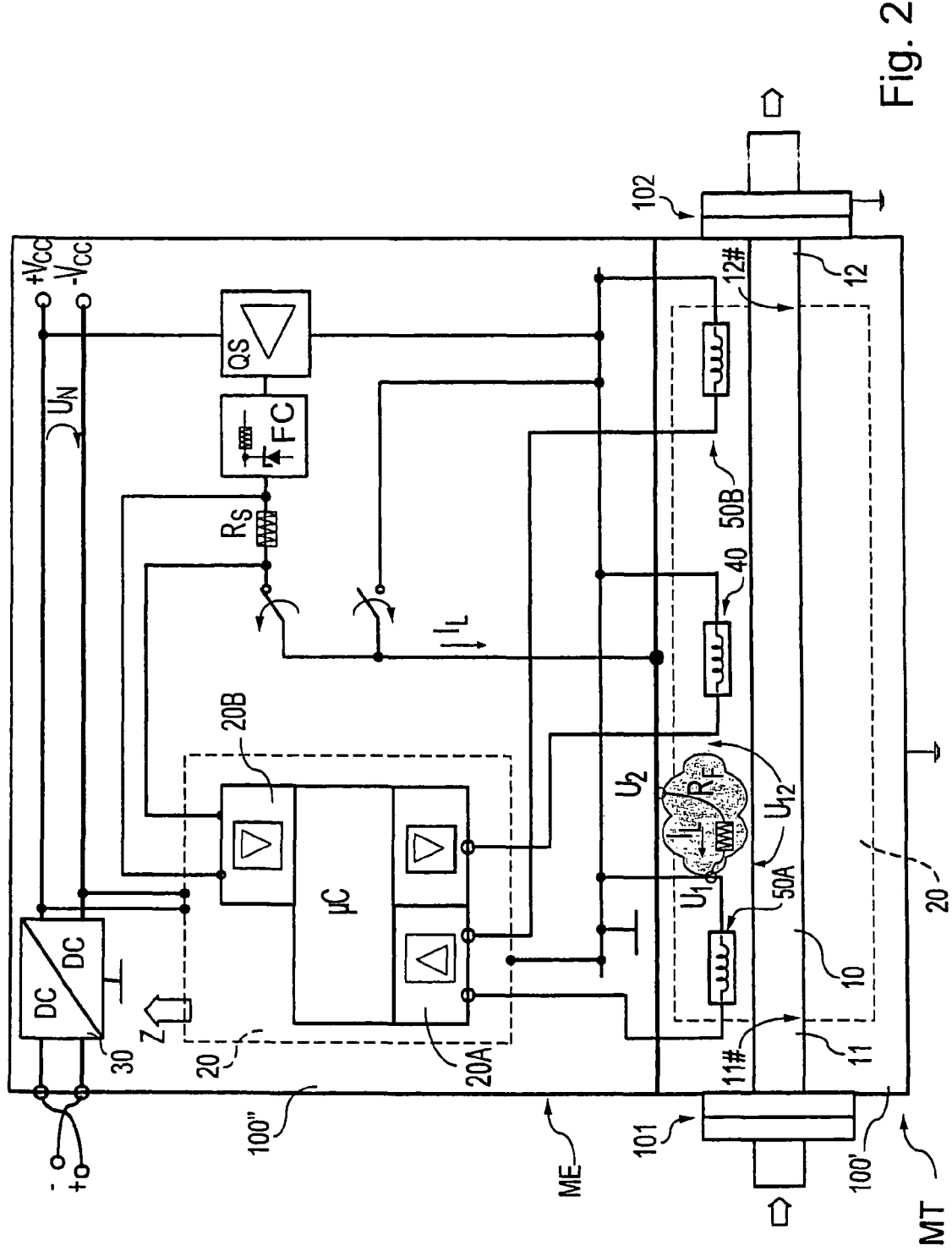
FIG. 2 schematically, a partially sectioned, side view of a first variant of a measuring device constructed according to FIG. 1, especially an in-line measuring device insertable into a pipeline for measuring at least one parameter of a medium conveyed in a pipeline.
Figure 3:
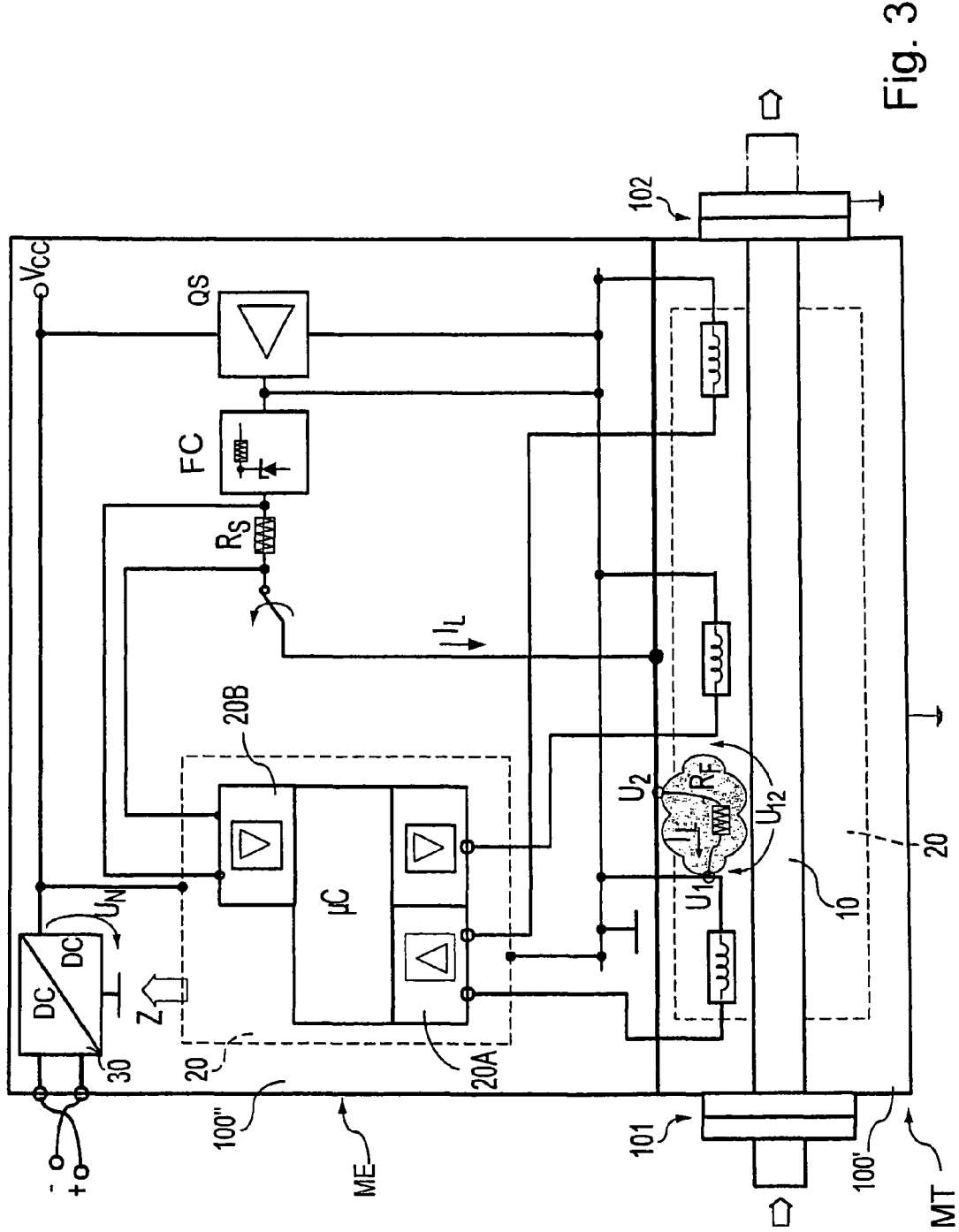
FIG. 3 schematically, a partially sectioned, side view of a second variant of a measuring device constructed according to FIG. 1, especially an in-line measuring device insertable into a pipeline for measuring at least one parameter of a medium conveyed in a pipeline.

As evident from the combination of FIGS. 1, 2 and 3, the measuring device includes therefor a measuring transducer MT accommodated in the housing 100, especially a grounded housing, here in a separate, transducer module 100' of the housing, for registering the at least one measured variable. Furthermore, the measuring device includes a measuring device electronics ME arranged within the housing, here at least partially within a separate, electronics module 100'' of the housing, and electrically connected, at least at times, with the measuring transducer MT. The measuring device electronics ME includes, in turn, an internal supply circuit 30, which, during operation, provides at least one internal, useful voltage $U_N$, which, such as schematically presented in FIG. 2, can be bipolar with $U_N = +V_{CC} \ldots -V_{CC}$ and/or, such as schematically presented in FIG. 3, can be unipolar with $U_N = V_{CC} \ldots 0$ and/or $U_N = V_{CC} \ldots$ GND. Moreover, the measuring device electronics 2 includes an evaluating, and operating, circuit 20, especially evaluating, and operating, circuit 20 formed by means of a microcomputer µC. The evaluating, and operating, circuit 20 includes at least one measurement channel 20A, for example, a measurement channel 20A also operated, at least partially, by means of the aforementioned useful voltage, for registering and further processing at least one primary signal s1, for example, a measurement voltage or a measurement current, generated by means of the measuring transducer MT and dependent on and, thus, corresponding to, the measured variable to be registered. For the purpose of digitizing the at least one primary signal s1, the measurement channel 20A can additionally include a corresponding A/D-converter. For visualizing measured values produced internally in the measuring device and/or, in given cases, status reports generated internally in the measuring device, such as, for instance, a defect report or an alarm, on-site, the measuring device includes, furthermore, according to an additional development of the invention, a display element DE, such as, for instance, an LCD- or TFT-display placed in the housing, communicating, at least at times, with the measuring device electronics.

For the further explanation of the invention, in the examples of embodiments illustrated in FIGS. 2 and 3, in each case, an inline measuring device of a type established in industrial measurements technology and having a measuring transducer of vibration-type has been selected for purposes of illustration. Measuring transducers of such type are known to those skilled in the art e.g. also from the above mentioned WO-A 95/16897, U.S. Pat. No. 6,910,366, U.S. Pat. No. 6,006,609, U.S. Pat. No. 6,505,519, U.S. Pat. No. 5,301,557, U.S. Pat. No. 4,957,005, US 2003/0208325, WO-A 99/39164, WO-A 98/07009, WO-A 01/33174, WO-A 00/57141, and WO-A 88/03261. The inline measuring device embodied, for example, as a Coriolis, mass flow, measuring device, a density measuring device, a viscosity measuring device, or the like, is insertable by means of suitable flange connections 101, 102 into the course of a pipeline (not shown) and serves for measuring and/or monitoring at least one parameter, for example, a mass flow, a density, a viscosity, etc., of a medium flowing in the pipeline. The measuring transducer serves in the here illustrated measuring device for producing, in a through-flowing medium, mechanical reaction forces, e.g. mass-flow dependent, Coriolis-forces, density-dependent, inertial forces and/or viscosity-dependent, frictional forces, which react on the measuring transducer registerably by sensor. Derived from these reaction forces, thus, in manner known to those skilled in the art, e.g. a mass flow m, a density and/or a viscosity of the medium can be measured.

For conveying the medium, the measuring transducer includes at least one measuring tube 10, which, in the here illustrated example of an embodiment, is essentially straight. During operation, measuring tube 10 is caused to vibrate and is, in such case, deformed oscillatingly, repeatedly elastically, about a static, rest position. Instead of a measuring transducer with, such as shown here or disclosed, for example, also in the above mentioned WO-A 03/095950, WO-A 03/095949, WO-A 95/16897, US-A 2005/0139015, U.S. Pat. No. 6,910,366, U.S. Pat. No. 6,691,583, U.S. Pat. No. 6,041,665, U.S. Pat. No. 6,006,609, U.S. Pat. No. 5,616,868, U.S. Pat. No. 5,253,533, a straight measuring tube, another option is, however, also measuring transducers with mutually parallel, straight measuring tubes, such as are shown, for example, in U.S. Pat. No. 5,218,873 or U.S. Pat. No. 5,602,345, or also measuring transducers with mutually parallel, bent measuring tubes, such as are disclosed in, among others, U.S. Pat. No. 6,711,958, U.S. Pat. No. 6,505,519, U.S. Pat. No. 5,796,011, U.S. Pat. No. 5,349,872, U.S. Pat. No. 5,301,557, U.S. Pat. No. 4,895,031, US 2003/0208325, U.S. Pat. No. 4,491,025, WO-A 99/39164, WO-A 98/07009, WO-A 01/33174, U.S. Pat. No. 4,876,898, WO-A 00/57141, WO-A 88/03261 or U.S. Pat. No. 6,895,826. Additionally, it is also possible to use measuring transducers with only a single, bent measuring tube, such as known from, for instance, WO-A 07/130,024, U.S. Pat. No. 4,187,721, U.S. Pat. No. 5,069,074, U.S. Pat. No. 6,484,591 or U.S. Pat. No. 6,666,098, or measuring transducers with a helically-shaped measuring tube, such as known, for instance, from U.S. Pat. No. 4,957,005.

In the operation of the measuring transducer, the measuring tube 10 is, for the purpose of producing primary signals s1, s2 (here, in the form of oscillation measurement signals), excited, at least at times, to vibrate in a wanted mode, especially in the region of a natural resonance frequency of a corresponding natural mode of oscillation, especially in the form of lateral, bending oscillations in a plane of oscillation. For the case, wherein the medium is flowing in the pipeline and, thus, the mass flow m is different from zero, the vibrating measuring tube 10 induces Coriolis forces in the medium flowing through the measuring tube 10. These, in turn, react on the measuring tube 10 and effect thus, as is known, an additional, sensorially registerable, deformation of the measuring tube 10 in the so-called Coriolis-mode, superimposed on the excited, wanted mode. The instantaneous form of this additional deformation of the measuring tube 10 is, in such case, especially as regards its amplitudes, dependent on the instantaneous mass flow m. For minimizing of disturbing influences acting on the measuring tube 10, as well as also for reducing oscillatory energy released from the measuring transducer to the connected pipeline, such as quite usual in the case of such measuring transducers with a single measuring tube, there is provided in the measuring transducer, additionally, a counteroscillator 13, which is, here, essentially straight and essentially parallel to the measuring tube 10. Counteroscillator 13 is, as also shown in FIG. 1, affixed to the measuring tube 10, on the inlet side, to form a first coupling zone 11# essentially defining an inlet end of the measuring tube 10 and, on the outlet side, to form a second coupling zone 12# essentially defining an outlet end of the measuring tube 10. Counteroscillator 13 can be tubular or box shaped and, for example, so connected on the inlet end and on the outlet end with the measuring tube 10, that it is directed essentially coaxially to measuring tube 10 and, thus, the measuring tube 10 is, at least partially, jacketed by the counteroscillator 13. Additionally, it can be of advantage, when the counteroscillator 13 is designed to be heavier than the measuring tube 10.

Measuring tube 10 is, furthermore, connected, via an inlet tube piece 11 opening on the inlet side in the region of the first coupling zone and via an outlet tube piece 12, especially one essentially identical to the inlet tube piece 11, opening on the outlet side in the region of the second coupling zone, to the pipeline (not shown), respectively, supplying and draining the medium. Inlet tube piece 11 and outlet tube piece 12 are, in the illustrated example of an embodiment, essentially straight and aligned relative to one another, to the measuring tube 10, and to a longitudinal axis L essentially connecting the coupling zones. In advantageous manner, measuring tube 10 and the inlet, and outlet, tube pieces 11, 12 can be embodied as one-piece, so that, for their manufacture, e.g. a single tubular stock, or semifinished part, can serve. Instead of this, that measuring tube 10, inlet tube piece 11 and outlet tube piece 12 are formed by segments of a single, one-piece tube, they can, however, also be produced by means of individual parts, which are subsequently joined together, e.g. welded together. For manufacture of the measuring transducer 1, moreover, practically any materials usual therefor, such as e.g. steel, titanium, tantalum, zirconium, etc., or also corresponding combinations of materials, can be used. For example, the application of titanium or zirconium for straight measuring tubes has been shown to be especially suitable, while, for example, for reasons of cost-saving, the transducer housing 100, as well as also the, in given cases, present counteroscillator, are quite advantageously made of steel.

For producing mechanical oscillations of the measuring tube 10, the measuring transducer includes, further, an exciter mechanism, for example, an electrodynamic exciter mechanism, electrically connected to the measuring device electronics, wherein the exciter mechanism includes an exciter coil 40 (here affixed to the counteroscillator 13) interacting with a permanent magnet (here affixed to the measuring tube 10). The exciter mechanism serves to convert an electrical exciter energy $E_{exc}$ injected by means of the operating, and evaluating, circuit 20 in the form of a correspondingly conditioned, electrical driver signal, e.g. having a controlled electrical current and/or a controlled voltage, into an exciter force $F_{exc}$ acting, e.g. with pulse-shape, clocked or harmonically, on the measuring tube 10, and elastically deforming such in the above-described manner. The exciter force $F_{exc}$ can, in such case, be bidirectional or, however, also unidirectional and can be adjusted, in manner known to those skilled in the art, e.g. by means of an electrical, current, and/or voltage, control circuit, as regards its amplitude and, e.g. by means of a phase control loop, as regards its frequency. Especially, the exciter mechanism is, such as quite usual in the case of such measuring transducers, additionally so embodied and arranged in the measuring transducer, that it acts essentially centrally on the measuring tube and/or affixed to the measuring tube, at least pointwise, externally along a central, peripheral line of the measuring tube. For detecting oscillations of the measuring tube 10, e.g. a sensor arrangement usual for such measuring transducers can be used, in the case of which, in manner known to those skilled in the art, by means of a first permanent magnet (not shown) placed on the inlet side on the measuring tube 10 and a first sensor coil 50A affixed to the counteroscillator 13 and interacting with the first permanent magnet and by means of a second permanent magnet (not shown) placed on the outlet side on the measuring tube 10 and a second sensor coil 50B here likewise affixed to the counteroscillator 13 and interacting with the second permanent magnet, the movements the measuring tube 10 are registered and converted into corresponding first and second, sensor signals s1, s2.

For connecting the exciter mechanism, as well as also the sensor arrangement, to the mentioned operating, and evaluating, circuit 20 of the inline measuring device, additionally, corresponding connecting lines are provided, which are led, at least sectionally, within the transducer housing. The connecting lines can, in such case, be embodied, at least partially, as electrically conductive wires encased, at least sectionally in an electrical insulation, e.g. in the form of "twisted pair" lines, flat ribbon cables and/or coaxial cables. Alternatively thereto or in supplementation thereof, the connecting lines can, at least sectionally, also be formed by means of conductive traces of an, especially, flexible, in given cases, lacquered, circuit board; compare, for this, also the above mentioned U.S. Pat. No. 6,711,958 or U.S. Pat. No. 5,349,872.

As already mentioned, in the case of a measuring device of the type being discussed, the problem can occur, that, during the course of operation, in undesired manner, an electrically conductive connection $R_F$ is formed between housing and measuring device electronics. This is symbolized in FIGS. 2 and 3, in each case, by the resistor $R_F$. Connection $R_F$ can come about, for example, as a result of a deposit affecting the housing and/or as a result of condensed water formed within the housing and/or as a result of medium penetrating into the housing in the case of a leak-affected, measuring transducer and/or an unsealed housing. Via the connection $R_F$, in given cases, leakage currents can flow, which disturb the operation. The electrical resistance of such a conductive connection can, in such case, be more than a decade smaller than a beginning insulating resistance between housing and measuring device electronics, especially, also, smaller than 1 Mohm. As a result of this, such conductive connections, whose electrical resistance can also, quite easily, be smaller than 500 kohm, can lead to the fact that the beginning insulating resistance between housing and measuring device electronics, which usually is dimensioned greater than 1 Mohm, especially greater than 10 Mohm, decreases significantly, especially to leakage-current-enabling values of smaller than 1 Mohm.

For purposes of monitoring the measuring device for the forming of such leakage currents favoring, electrically conductive connections $R_F$ and/or for purposes of detecting an incorrect operating state of the measuring device accompanying such a conductive connection, it is additionally provided, during operation, by means of the measuring device electronics, to produce, on purpose, at least at times, a potential difference $\Delta U_{12}$ between housing 100 and measuring device electronics ME, for driving a defined leakage current $I_L$, for example, in an order of magnitude of about 100 nA to about 100 µA, both through the measuring device electronics ME as well as, additionally, through such an electrically conductive connection $R_F$ of the aforementioned type exposed to this potential difference $\Delta U_{12}$. Furthermore, the leakage current $I_L$ flowing as a result of the potential difference $\Delta U_{12}$ present, at least instantaneously, between housing 100 and measuring device electronics ME, and as a result of the electrically conductive connection $R_F$ present, at least instantaneously, is correspondingly registered by means of the measuring device electronics, in order to generate, based thereon, at least one state value Z, which instantaneously represents the instantaneous, according to definition, defective, or, at least, undesired, operating state of the measuring device.

The potential difference $\Delta U_{12}$ between housing 100 and measuring device electronics ME driving the leakage current can be formed in simple manner, e.g. by placing the housing 100 at a first electrical reference potential $U_1$, especially a ground, or earth, potential, and by placing at least one component of the measuring device electronics ME, especially the at least one measurement channel 20A, at least at times, and/or at least partially, at a second electrical reference potential $U_2$ different from the first electrical reference potential $U_1$, for example, at about 50% of the useful voltage $U_N$ delivered by the internal supply circuit 30.

In an additional embodiment of the invention, the measuring device electronics additionally includes, serving for registering electrical currents flowing internally in the measuring device, for example, integrated into the evaluating, and operating, circuit 20 and/or communicating, during operation, at least at times, with the microcomputer μC, an electrical current measuring circuit 20B, which, at least at times, especially recurringly, registers an electrical leakage current $I_L$ flowing, as a result of the potential difference $\Delta U_{12}$ existing, at least at times, between housing 100 and measuring device electronics ME, as well as the aforementioned, electrically conductive connection $R_F$ likewise existing between housing 100 and measuring device electronics ME, through such electrically conductive connection, as well as also within the measuring device electronics ME. In an additional embodiment of the invention, the electrical current measuring circuit 20B includes, additionally, for registering the leakage current $I_L$ driven by the potential difference $\Delta U_{12}$, a sensing resistor $R_S$, through which flows, during operation, at least in the case of presence of an electrically conductive connection between measuring device electronics ME and housing 100, in given cases, leakage current $I_L$ brought about in the above-described manner, so that a voltage, $R_S \cdot I_L$, essentially proportional to the leakage current $I_L$ falls thereacross. For the purpose of transmitting the registered leakage current $I_L$ to the, in given cases, present microcomputer μC, the electrical current measuring circuit 20B includes, according to an additional embodiment of the invention, at least one A/D-converter serving for digitizing the registered leakage current $I_L$, and delivering, at least at times, at an output, a digital signal digitally representing the registered leakage current $I_L$.

For producing the potential difference $\Delta U_{12}$ driving the electrical leakage current $I_L$, the measuring device additionally includes a source circuit QS, especially a source circuit QS likewise operated by means of the supply circuit 30, or by means of the internal, useful voltage $U_N$ provided therefrom. Source circuit QS delivers, at an output, for example, at least at times, an essentially constant and/or clocked and/or pulse-shaped and/or periodic, output voltage. Source circuit QS can, in such case, be additionally so embodied, that its output voltage and, as a result, also the therewith correspondingly set, reference potential $U_2$ of the measuring device electronics can be altered in magnitude and/or sign, for example, abruptly and/or stepwise and/or cyclically, and/or, that its output voltage is an alternating voltage, especially an alternating voltage of changeable frequency. Control of the source circuit QS, or the therefrom provided, output voltage, can, for example, be accomplished by means of the microcomputer μC, which can be provided in the measuring device electronics ME, which, in accordance therewith, communicates during operation, at least at times, with the source circuit.

As presented schematically in FIG. 1, the output of the source circuit QS is, during operation, at least at times, electrically connected with the housing, for example, by means of a switch, at least for the purpose of the producing the potential difference $\Delta U_{12}$ driving the leakage current $I_L$. For the above mentioned case, wherein the housing is grounded, thus, also the measuring device electronics can at times, especially, also, during regular measurement operation, and/or at least partially, likewise be placed at the first electrical reference potential $U_1$, here, thus, ground, or earth, potential.

At least for the case illustrated in FIG. 2, wherein the internal, useful voltage $U_N$ delivered by the supply circuit 30 is unipolar ($V_{CC}$) and, as a result thereof, such as quite usual in the case of measuring transducers of vibration-type, at least the evaluating, and operating, circuit 20, especially, however, its measurement channel 20A, also in normal measuring operation, is operated, at the same time, at voltage levels different from one another, for example, both with an internal, useful voltage $U_N = V_{CC}$ as well as also with $0.5 \cdot U_N = 0.5 V_{CC}$, the output of the source circuit QS can be electrically connected with the housing, for example, also permanently. Accordingly, the source circuit QS is, according to an additional embodiment of the invention, additionally so embodied, that its output voltage and/or the potential difference $\Delta U_{12}$ set therewith between housing and measuring device electronics amounts, at least at times, essentially to about 50% of the internal, useful voltage $U_N$. Alternatively thereto or in supplementation thereof, especially for the case, wherein the measuring device is to be designed such that it fulfills the requirements for ignition protection type "intrinsic safety" (Ex-i), it is additionally provided, that the source circuit QS is so dimensioned, that at least the potential difference $\Delta U_{12}$ between housing and measuring device electronics set therewith and serving for driving the leakage current $I_L$ is kept always smaller than 40 volt, especially, at its highest, 32 volt. In advantageous manner, the source circuit QS can e.g. also be so embodied therefor, that its output voltage serving for forming the potential difference $\Delta U_{12}$ between housing and measuring device electronics, amounts to maximum 40 volt, especially less than 32 volt.

In an additional embodiment of the invention, the measuring device electronics includes, especially for the mentioned case, wherein the measuring device is to be designed such that it fulfills the requirements for ignition protection type "intrinsic safety" (Ex-i), additionally a filter circuit FC, especially a filter circuit FC acting to limit current and/or voltage. Filter circuit FC is connected electrically during operation, at least at times, or also durably, both to the output of the source circuit QS as well as also to the housing 100, in given cases, also under application of electronic switches. The filter circuit FC can be formed, for example, by means of a resistor network serving as voltage divider and/or as current limiter and/or by means of a diode circuit serving as voltage rectifier and/or as voltage limiter. The resistor network provided, in given cases, in the measuring device electronics and serving as voltage divider and/or as current limiter for the leakage current and/or the diode circuit provided, in given cases, in the measuring device electronics and serving as voltage rectifier and/or as voltage limiter for the output voltage of the source circuit QS can, such as schematically indicated in FIG. 2 or 3, be electrically connected, be it durably or, however, also, only temporarily, during operation, for example, by means of a switch, to the output of the source circuit QS and/or to the housing 100.

In an additional embodiment of the invention, the measuring device electronics ME, based on the leakage current $I_L$ registered by the electrical current measuring circuit, generates, for example, by means of the microcomputer μC provided, in given cases, in the measuring, and operating, circuit 20, at least one, especially digital, state value Z instantaneously representing an operating state of the measuring device. For detecting a defect possibly present in the measuring device as a result of a conductive connection $R_F$ between measuring device electronics ME and housing 100 and/or for the purpose of ascertaining the state value Z, the measuring device electronics includes, according to an additional embodiment of the invention, additionally, at least one comparator, in given cases, implemented also by means of the microcomputer μC communicating via A/D-converter with the electrical current measuring circuit, wherein the comparator serves for comparing the registered leakage current $I_L$ with at least one threshold value predetermined therefor, for example, also revisable on the part of the user. For the case, wherein the state value Z represents a defective operating state corresponding to the presence of a conductive connection between measuring device electronics ME and housing 100, it can be of advantage, that the measuring device electronics ME, based on the leakage current $I_L$ registered by the electrical current measuring circuit, or based on the state value Z, generates an alarm, especially an alarm directly perceptible on-site and signaling the occurrence of a defect in the measuring device, especially a defect caused by undesired forming of conductive deposits ($R_F$) within the housing 100. The state value Z can then serve for activating the display element DE communicating at least momentarily with the measuring device electronics ME, for example, translated into a corresponding cleartext, defect report, a defect code and/or an alarm-providing, color value for the display element DE, and/or used for producing a switching command serving for intervention into the process monitored by means of the then defective, measuring device. Alternatively thereto or in supplementation thereof, the state value Z and/or the alarm derived therefrom can also be sent, e.g. wirelessly per radio and/or hardwired, to a superordinated electronic data processing system communicating, during operation, with the measuring device.

The invention claimed is:

1. A method for monitoring a measuring device, especially a measuring device embodied as a measuring, and/or switch, device of industrial measuring, and automation, technology and/or an electronic, measuring device, wherein the measuring device includes a measuring transducer accommodated, at least partially, in a housing, especially a grounded, and/or metal, housing, and a measuring device electronics connected, at least at times, with the measuring transducer, which method comprises the steps of:

producing a potential difference between the housing and the measuring device electronics for effecting a leakage current, which flows both through the measuring device electronics as well as also through an electrically conductive connection situated between the housing and the measuring device electronics and exposed to this potential difference, especially an undesired, electrically conductive connection and/or an electrically conductive connection formed by a deposit affecting the housing and/or by condensed water;

registering the leakage current flowing as a result of the potential difference existing, at least instantaneously, between the housing and the measuring device electronics and as a result of the at least instantaneously existing, electrically conductive connection; and generating at least one state value, especially a digital state value, instantaneously representing an operating state, especially a defective operating state, of the measuring device, taking into consideration the registered leakage current.

2. The method as claimed in the preceding claim, wherein: the potential difference between the housing and the measuring device electronics is formed by placing the housing at a first electrical, reference potential and at least one component of the measuring device electronics, especially a measurement channel for registering at least one primary signal generated by means of the measuring transducer, at least at times, at a second electrical reference potential different from the first electrical reference potential.

3. The method as claimed in claim 2, wherein:
the housing is grounded for forming the first electrical reference potential; and/or
the measuring device electronics lies, at times, likewise at the first electrical reference potential.

4. The method as claimed in claim 1, further comprising the step of:
changing, especially abruptly and/or stepwise and/or periodically, at least one reference potential of the measuring device electronics for producing the potential difference between housing and measuring device electronics.

5. The method as claimed in claim 1, further comprising steps of:
galvanically connecting to the housing, especially with interposition of a current, and/or voltage, limiting, filter circuit, an output of a source circuit provided within the measuring device electronics; and
delivering an output voltage, especially, at least at times, an output voltage, which is essentially constant and/or clocked and/or pulse-shaped, for forming the potential difference between housing and measuring device electronics.

6. The method as claimed in claim 1, further comprising a step of:
applying the at least one state value for generating an alarm signaling occurrence of a defect in the measuring device, especially a defect caused by undesired forming of conductive deposits within the housing.

7. The method as claimed in claim 1, further comprising a step of:
producing, by means of the measuring transducer, at least one primary signal, which corresponds to at least one measured variable of a medium conveyed or held in a pipeline, especially an electrically grounded pipeline, and/or a container, especially an electrically grounded container.

8. The method as claimed in claim 7, further comprising a step of:
comparing the at least one state value with at least one threshold value predetermined therefor, especially a threshold value, which is, also, revisable.

9. The method as claimed in claim 7, wherein:
the measuring device electronics includes at least one measurement channel, operated with a measuring-device-internal, useful voltage, for registering at least one primary signal generated by means of the measuring transducer; and
the potential difference between housing and measuring device electronics is set, at least at times, at 50% of the internal, useful voltage.

10. The method as claimed in claim 7, wherein:
the potential difference between housing and measuring device electronics is set at 40 volt or less, especially smaller than 32 volt, for driving the leakage current.

11. The method as claimed in claim 7, further comprising a step of:
applying the at least one state value for activating a display element communicating, at least at times, especially instantaneously, with the measuring device electronics, especially a display element also visualizing defect reports generated by the measuring device.

12. A measuring device for measuring and/or monitoring at least one measured variable of a medium conveyed or held in a pipeline and/or container, which measuring device comprises:
a measuring transducer accommodated at least partially in a housing, especially a grounded and/or metal housing, for registering the at least one, measured variable; and,
electrically connected, at least at times, with the measuring transducer, a measuring device electronics, which includes: at least one measurement channel for registering and further processing at least one primary signal generated by means of the measuring transducer, and an electrical current measuring circuit for registering measuring-device-internally flowing, electrical currents, wherein:
said electrical current measuring circuit registers, at least at times, especially recurringly, an electrical leakage current, which flows as a result of the potential difference existing, at least at times, between said housing and said measuring device electronics and as a result of an electrically conductive connection likewise existing between said housing and said measuring device electronics, especially an undesired, electrically conductive connection and/or an electrically conductive connection formed by a deposit affecting said housing.

13. The measuring device as claimed in claim 12, wherein: the potential difference between said housing and said measuring device electronics is formed by placing said housing at a first electrical reference potential and by placing at least one component of said measuring device electronics, especially the measurement channel, at least at times, at a second electrical reference potential different from said first electrical reference potential.

14. The measuring device as claimed in claim 13, wherein:
said housing is grounded for forming said first electrical reference potential; and/or
said measuring device electronics lies, at times, likewise at said first electrical reference potential.

15. The measuring device as claimed in claim 12, further comprising:
at least one source circuit delivering, at an output, an output voltage, especially, at least at times, an essentially constant and/or clocked and/or pulse-shaped, output voltage.

16. The measuring device as claimed in claim 15, wherein:
the output of said source circuit is electrically connected during operation, at least at times, especially durably, with said housing for producing the potential difference existing between said housing and said measuring device electronics.

17. The measuring device as claimed in claim 15, wherein:
said source circuit is so embodied, that its output voltage is changeable, especially abruptly and/or stepwise changeable.

18. The measuring device as claimed in claim 15, wherein:
said source circuit is so embodied, that its output voltage is an alternating voltage, especially an alternating voltage of changeable frequency.

19. The measuring device as claimed in claim 15, wherein:
said measuring device electronics additionally includes a filter circuit, especially a filter circuit formed by means of a resistor network serving as voltage divider and/or as current limiter and/or formed by means of a diode circuit serving as voltage rectifier and/or as voltage limiter; and said filter circuit is electrically connected, especially by means of switch, during operation, at least at times, especially durably, both to said output of said source circuit as well as also to said housing.

20. The measuring device as claimed in claim 15, wherein:
said measuring device electronics additionally includes a resistor network serving as voltage divider and/or as current limiter; and
said resistor network is electrically connected, especially by means of switch, during operation, at least at times, especially durably, both to said output of said source circuit as well as also to said housing.

21. The measuring device as claimed in claim 15, wherein:
said measuring device electronics additionally includes a diode circuit serving as voltage rectifier and/or as voltage limiter; and
said diode circuit is electrically connected, especially by means of a switch, during operation, at least at times, especially durably, both to said output of said source circuit as well as also to said housing.

22. The measuring device as claimed in claim 15, wherein:
said at least one measurement channel is operated with a measuring-device-internal, useful voltage; and
said source circuit is so embodied, that its output voltage and/or the potential difference between said housing and said measuring device electronics is set, at least at times, at 50% of the internal, useful voltage.

23. The measuring device as claimed in claim 22, wherein:
said useful voltage serves also for operating said source circuit.

24. The measuring device as claimed in claim 15, wherein:
said source circuit is so embodied, that its output voltage serving for forming the potential difference between said housing and said measuring device electronics amounts to a maximum of 40 volt, especially less than 32 volt; and/or
the potential difference between said housing and said measuring device electronics serving for driving the leakage current is kept always smaller than 40 volt, and, especially, amounts, at its highest, to 32 volt.

25. The measuring device as claimed in claim 12, wherein:
the electrically conducting connection between said housing and said measuring device electronics enabling said leakage current has an electrical resistance, which is smaller than a beginning insulating resistance between said housing and said measuring device electronics, especially more than a decade smaller, and/or is smaller than 1 Mohm, especially smaller than 500 kohm.

26. The measuring device as claimed in claim 12, wherein:
a beginning insulating resistance between said housing and said measuring device electronics is greater than 1 Mohm, especially greater than 10 Mohm.

27. The measuring device as claimed in claim 12, wherein:
said electrical current measuring circuit includes a sensing resistor, across which a voltage falls, which is essentially proportional to said leakage current.

28. The measuring device as claimed in claim 12, wherein:
said measuring device electronics includes at least one comparator for comparing the registered leakage current with at least one threshold value predetermined therefor, especially, also, a revisable, predetermined threshold value.

29. The measuring device as claimed in claim 12, wherein:
said measuring device electronics, based on said leakage current registered by said electrical current measuring circuit, generates an alarm, which signals occurrence of a defect in the measuring device, especially a defect caused by undesired forming of conductive deposits within said housing.

30. The measuring device as claimed in claim 12, further comprising:
a display element for visualizing measuring-device-internally generated, defect reports, especially an alarm generated based on the leakage current registered by said electrical current measuring circuit.

31. The measuring device as claimed in claim 12, wherein:
said measuring device electronics, based on said leakage current registered by said electrical current measuring circuit, generates at least one state value, especially a digital state value, which represents, instantaneously, an operating state of the measuring device, especially a defective operating state.

32. The measuring device as claimed in claim 31, wherein:
said measuring device electronics, based on the state value, generates an alarm, which signals occurrence of a defect in the measuring device, especially a defect caused by undesired forming of conductive deposits within said housing.

33. The measuring device as claimed in claim 12, wherein:
said measuring device electronics further includes a microcomputer, especially a microcomputer communicating, at least at times, with said electrical current measuring circuit and/or, at least at times, with said source circuit.

34. The measuring device as claimed in claim 33, wherein:
said electrical current measuring circuit includes at least one A/D-converter for digitizing the registered leakage current, which A/D-converter delivers, at least at times, at an output, a digital signal digitally representing the registered leakage current.

35. The measuring device as claimed in claim 31, wherein:
said electrical current measuring circuit includes at least one A/D-converter for digitizing the registered leakage current; and
said measuring device electronics further includes a microcomputer communicating, at least at times, with said electrical current measuring circuit via an A/D-converter, for generating, based on the leakage current registered by said electrical current measuring circuit and based on the digitized leakage current, the at least one state value.

* * * * *